(12) United States Patent
Jadhav et al.

(10) Patent No.: US 9,996,613 B2
(45) Date of Patent: Jun. 12, 2018

(54) SYSTEM AND METHOD FOR ACCESSIBILITY ASSESSMENT OF A WEB APPLICATION

(71) Applicant: Tata Consultancy Services Limited, Mumbai (IN)

(72) Inventors: Charudatta Jadhav, Mumbai (IN); Ravi Hanmant Mahamuni, Pune (IN); Sumeet Agrawal, Mumbai (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 173 days.

(21) Appl. No.: 14/921,405

(22) Filed: Oct. 23, 2015

(65) Prior Publication Data
US 2016/0261475 A1    Sep. 8, 2016

(30) Foreign Application Priority Data

Mar. 5, 2015  (IN) ............ 730/MUM/2015

(51) Int. Cl.
G06F 15/173    (2006.01)
G06F 17/30     (2006.01)

(52) U.S. Cl.
CPC ................ *G06F 17/30861* (2013.01)

(58) Field of Classification Search
CPC ............ G06F 17/30861; H04L 67/02
See application file for complete search history.

(56) References Cited

U.S. PATENT DOCUMENTS 8,196,104 B2    6/2012  Cohrs et al.
2004/0148568 A1*  7/2004  Springer ........... G06F 17/30899
                                                       715/205

(Continued)

FOREIGN PATENT DOCUMENTS

CN    103218286 A    7/2013
CN    103279548 A    9/2013

OTHER PUBLICATIONS

Karl Groves, "Web Accessibility Testing: What Can be Tested and How", Sep. 15, 2012 (6 pages).

(Continued)

*Primary Examiner* — Scott B Christensen
(74) *Attorney, Agent, or Firm* — Shumaker, Loop & Kendrick, LLC

(57) ABSTRACT

System and method for accessibility testing of a web application is disclosed. Initially the system is configured to receive an accessibility standard and a level of conformance to be achieved for accessibility testing of a webpage associated with the web application. The system is further configured to identify a first set of an accessibility guidelines based on the accessibility standard and the level of conformance. The system further identifies a set of elements present in the webpage and determines a second set of the accessibility guidelines based upon the set of elements and a set of common guidelines applicable to all the webpage's of the web application. Furthermore, the system computes a number of occurrences of each element from the set of elements present in the webpage. Further, the system is configured to determine the time required for testing the web page using different combinations of testing tools by using an optimization engine based on the second set of accessibility guidelines, the level of conformance, and the number of occurrences of the element of each type in the webpage. Further the system enables performing a rule based analysis on the time required for testing the webpage using different combination of testing tools in order to determine a combination of accessibility testing tools to be used for accessibility testing of the web application.

13 Claims, 6 Drawing Sheets

(56) References Cited

U.S. PATENT DOCUMENTS

| | | | | |
|---|---|---|---|---|
| 2006/0282771 A1* | 12/2006 | Vinci | ............... | G06F 17/2725 |
| | | | | 715/209 |
| 2012/0254826 A1* | 10/2012 | Ganesh | ............ | G06F 11/3672 |
| | | | | 717/101 |
| 2014/0123295 A1* | 5/2014 | Kuykendall | ......... | G06F 21/577 |
| | | | | 726/25 |

OTHER PUBLICATIONS

Ashli M. Molinero & Frederick G. Kohun, "Reliability in Automated Evaluation Tools for Web Accessibility Standards Compliance", Issues in Information Systems, 2006, 218-222, vol. VII, No. 2, USA (5 pages).

Accessibility Testing Tool Requirements, SSB BART Group reference (6 pages).

\* cited by examiner

SYSTEM AND METHOD FOR ACCESSIBILITY ASSESSMENT OF A WEB APPLICATION

CROSS-REFERENCE TO RELATED APPLICATIONS AND PRIORITY

The present application claims priority to Indian Patent Application 730/MUM/2015, filed on Mar. 5, 2015, the entirety of which is hereby incorporated by reference.

TECHNICAL FIELD

The present disclosure generally relates to accessibility testing, and more particularly, the present disclosure relates to a system and method for determining optimal ways to perform accessibility testing of a web application

BACKGROUND

Nowadays, the Internet arguably is the most useful technology due to its versatility. For example, the Internet provides access to news, information, email, chatting, social networking websites, job sites, online payment options, banking, downloading, blogs, videos, shopping and much more. The use of Internet has simplified our day-to-day activities. The global Information Technology (IT) user base is expanding rapidly, with a significant share comprising users with function limitation. The United Nation (UN) convention recognizes the importance of access to information as a basic human right and has set forth accessibility guidelines to access content available on the Internet. With increasing litigation and awareness, accessibility has become an increasingly critical issue for industries and government agencies.

Non-compliance with accessibility requirements for a website can lead to significant legal costs and have a detrimental effect on an organization's reputation and more importantly hampers equal opportunities to people with disability (Pwd). Further, a website accessible to people with disability also helps gain a competitive advantage in growing markets and increase revenue by widening the audience reach to the website thus increasing business and customer loyalty. To render any website or web based system accessible, designers need to comply with web accessibility standards and guidelines (WCAG 2.0) and respective laws and regulations of a country in which the website is accessible.

Since manual accessibility assessment is a laborious and extensive task, automated testing for accessibility assessment of webpage's is preferred. Even though automated testing has reduced efforts considerably, automated testing has certain limitations. For example, when the automated testing process claims that an accessibility guideline is being fulfilled this may in fact be inaccurate. For instance, in an exemplary webpage, if all images contain alt text then the automated testing results may report a pass for this guideline of the accessibility standard. But, in certain aspects, if the alt text isn't descriptive of its image, this clearly cannot be identified programmatically using automated testing, and thus, some degree of human judgment is required for accessibility testing. Hence there is a clear need to not rely on automated testing alone but to follow it up with manual testing and end user testing where human intelligence can play an important role.

Further, manual testing is classified into two subcategories namely using tools and using assistive technology tool such as screen readers.

The manual testing using tools is also referred as semi automated testing. The semi automated testing process makes use of tools such as accessibility toolbars and captures issues which need human judgment. In the process of manual testing, the tester would do a manual interpretation of different aspects of the tested webpage. The key activity involved in manual testing using accessibility toolbars is to verify navigation components, text equivalents, tables, ease in viewing content, colour contrast analyzer.

Further, the tools employed in a manual testing process include testing with Assistive technology tool(s) including for example Screen Reader. The process of manual testing using assistive technology tools like Screen Readers, Screen Magnifier, Dragon Naturally Speaking involves testing for support for text alternatives for non-text content and multimedia, keyboard operability, navigational mechanisms, information provided through presentation, sufficient time to use content, error handling, and readability of content. Behaviour of webpage's using different browsers, and screen readers' settings, preferences and interaction parameters are also validated using manual testing tools. Key activities in this process include user centered navigations, identifying operations, and testing is primarily done using the screen reader to do end user simulation and capture any criteria missed in the above validations. Tools employed for manual testing include screen readers such as 'JAWS' or 'NVDA'.

Though these testing processes have certain advantages for webpage testing, it is difficult to determine which tool or a combination of tools should be used to test any particular checkpoint in order to gain maximum efficiency in the process of accessibility testing of a particular webpage.

Further, users with disabilities are engaged to test the webpage in the process of End User Acceptance Testing (UAT). This process involves, allowing the end user to interact with the webpage to check their experiences. Testing is done by end users having disabilities using various assistive technologies to capture specific access barriers and the overall user experience. Tools used in this phase involve assistive technologies tools such as Screen readers and Screen Magnifier.

SUMMARY

This summary is provided to introduce aspects related to systems and methods for determining optimal way to perform accessibility testing of a web application by effectively using the different type of accessibility testing tools and the aspects are further described below in the detailed description. This summary is not intended to limit the scope of the claimed subject matter.

In one implementation, a system for accessibility testing of a web application is disclosed. The system includes a memory and a processor coupled to the memory, wherein the processor is configured to receive an accessibility standard and a level of conformance to be achieved for accessibility testing of a webpage associated with the web application. Further, the processor is configured to identify a first set of accessibility guidelines based on the accessibility standard and the level of conformance. Further, the processor identifies a set of elements present in the webpage. Further, the processor determines a second set of accessibility guidelines based upon the set of elements present in the webpage and a set of common guidelines applicable to all the webpage's of the web application, wherein the second set of accessibility guidelines is a subset of the first set of accessibility guidelines. Further, the processor is configured to identify a number of occurrences of each element from the set of elements present in the webpage. Further, the processor is configured enable an optimization engine to determine the time required for testing the web page using different combinations of testing tools based on the second set of accessibility guidelines, the level of conformance, and the number of occurrences of the element of each type in the webpage. Further the processor enables performing a rule based analysis on the time required for testing the webpage using different combination of testing tools in order to determine a combination of accessibility testing tools to be used for accessibility testing of the web application.

In one implementation, a method for accessibility testing of a web application is disclosed. Initially, an accessibility standard and a level of conformance to be achieved for accessibility testing of a webpage associated with the web application are received by a processor. In the next step, a first set of accessibility guidelines are identified by the processor based on the accessibility standard and the level of conformance. Further, a set of elements present in the webpage are identified by the processor. Further, a second set of accessibility guidelines and a set of common guidelines applicable to all the webpage's of the web application is determined by the processor based upon the set of elements present in the webpage, wherein the second set of accessibility guidelines is a subset of the first set of accessibility guidelines. Once the second set of accessibility guidelines is determined, in the next step, a number of occurrences of each element from the set of elements present in the webpage are determined by the processor. Further, the time required for testing the web page using different combinations of testing tools based on the second set of accessibility guidelines, the level of conformance, and the number of occurrences of the element of each type in the webpage is determined by an optimization engine enabled by the processor. Further the processor enables performing a rule based analysis on the time required for testing the webpage using different combination of testing tools in order to determine a combination of accessibility testing tools to be used for accessibility testing of the web application.

In one implementation, a computer program product having embodied thereon a computer program for accessibility testing of a web application is disclosed. The program includes a program code for receiving an accessibility standard and a level of conformance to be achieved for accessibility testing of a webpage associated with the web application. Further, the program includes a program code for identifying a first set of accessibility guidelines based on the accessibility standard and the level of conformance. Further, the program includes a program code for identifying a set of elements present in the webpage. Further, the program includes a program code for determining a second set of accessibility guidelines and a set of common guidelines applicable to all the webpage's of the web application based upon the set of elements present in the webpage, wherein the second set of accessibility guidelines is a subset of the first set of accessibility guidelines. Further, the program includes a program code for determining the time required for testing the web page using different combinations of testing tools based on the second set of accessibility guidelines, the level of conformance, and the number of occurrences of the element of each type in the webpage is the web application using an optimization engine. Further, the program includes a program code for performing a rule based analysis on the time required for testing the webpage using different combination of testing tools in order to determine a combination of accessibility testing tools to be used for accessibility testing of the web application.

BRIEF DESCRIPTION OF DRAWINGS

The detailed description is described with reference to the accompanying Figures. In the Figures, the left-most digit(s) of a reference number identifies the Figure in which the reference number first appears. The same numbers are used throughout the drawings to refer like/similar features and components.

DETAILED DESCRIPTION

The present disclosure relates to systems and methods for accessibility testing of a webpage. The system is enabled to integrate accessibility into Software Development Life Cycle (SDLC) and using the right tool at right time/phase and also the right tool to test the checkpoint as per the scope of the webpage to reduce the overall testing efforts and decrease development cycle times.

In one implementation, the system is configured to receive an accessibility standard and a level of conformance to be achieved for accessibility testing of the webpage. The system is further configured to identify a first set of accessibility guidelines based on the accessibility standard and the level of conformance. The system further identifies a set of elements present in the webpage and determines a second set of accessibility guidelines from the first set of accessibility guidelines based upon the set of elements present in the webpage and a set of common guidelines applicable to all the webpage's of the web application. Furthermore, the system computes a number of occurrences of each element from the set of elements present in the webpage. Further, the system determines the time required for testing the web page using different combinations of testing tools based on the second set of accessibility guidelines, the level of conformance, and the number of occurrences of the element of each type in the webpage is the web application using an optimization engine. Finally, the system performs a rule based analysis on the time required for testing the webpage using different combination of testing tools in order to determine a combination of accessibility testing tools to be used for accessibility testing of the web application.

While aspects of described system and method for accessibility testing of webpage are implemented over a dedicated platform, it may be implemented in any number of different computing systems, environments, and/or configurations, the embodiment's are described in the context of the following exemplary system.

Figure 1:
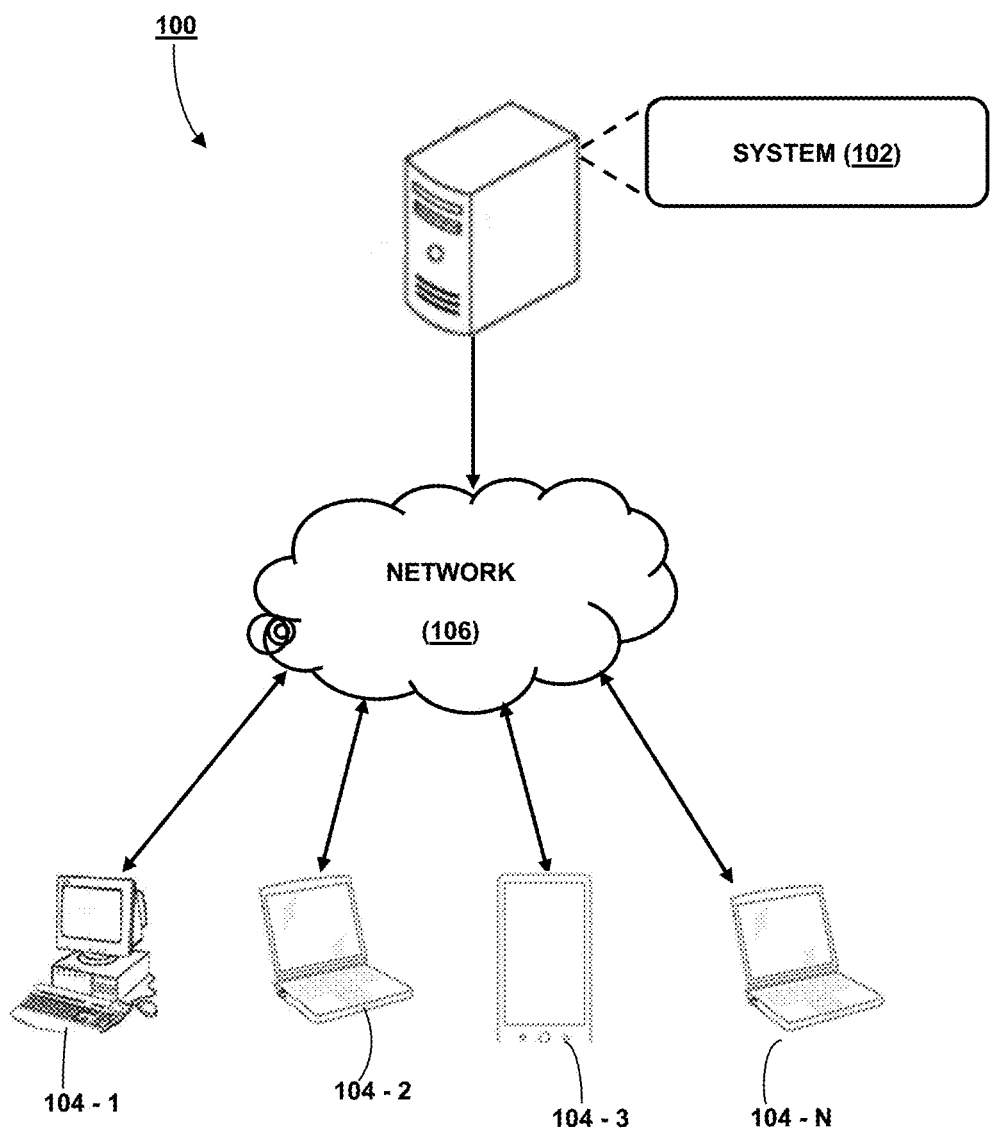
FIG. 1 illustrates a network implementation of a system for accessibility testing of a webpage is disclosed, in accordance with an embodiment of the present disclosure.

Referring now to FIG. 1, a network implementation 100 of a system 102 for accessibility testing the webpage is illustrated, in accordance with an embodiment of the present disclosure. Although the present disclosure is explained by considering that the system 102 is implemented as a software program on a server, it may be understood that the system 102 may also be implemented in a variety of computing systems, such as a laptop computer, a desktop computer, a notebook, a workstation, a mainframe computer, a server, a network server, cloud, and the like. It will be understood that the system 102 may be accessed by multiple users through one or more user devices 104-1, 104-2, 104-3, 104-N, collectively referred to as user devices 104 hereinafter, or applications residing on the user devices 104. Examples of the user devices 104 may include, but are not limited to, a portable computer, a personal digital assistant, a hand-held device, and a workstation. The user devices 104 are communicatively coupled to the system 102 through a network 106.

In one implementation, the network 106 may be a wireless network, a wired network or a combination thereof. The network 106 can be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 106 may include a variety of network devices, including routers, bridges, servers, computing devices, storage devices, and the like.

Figure 2:
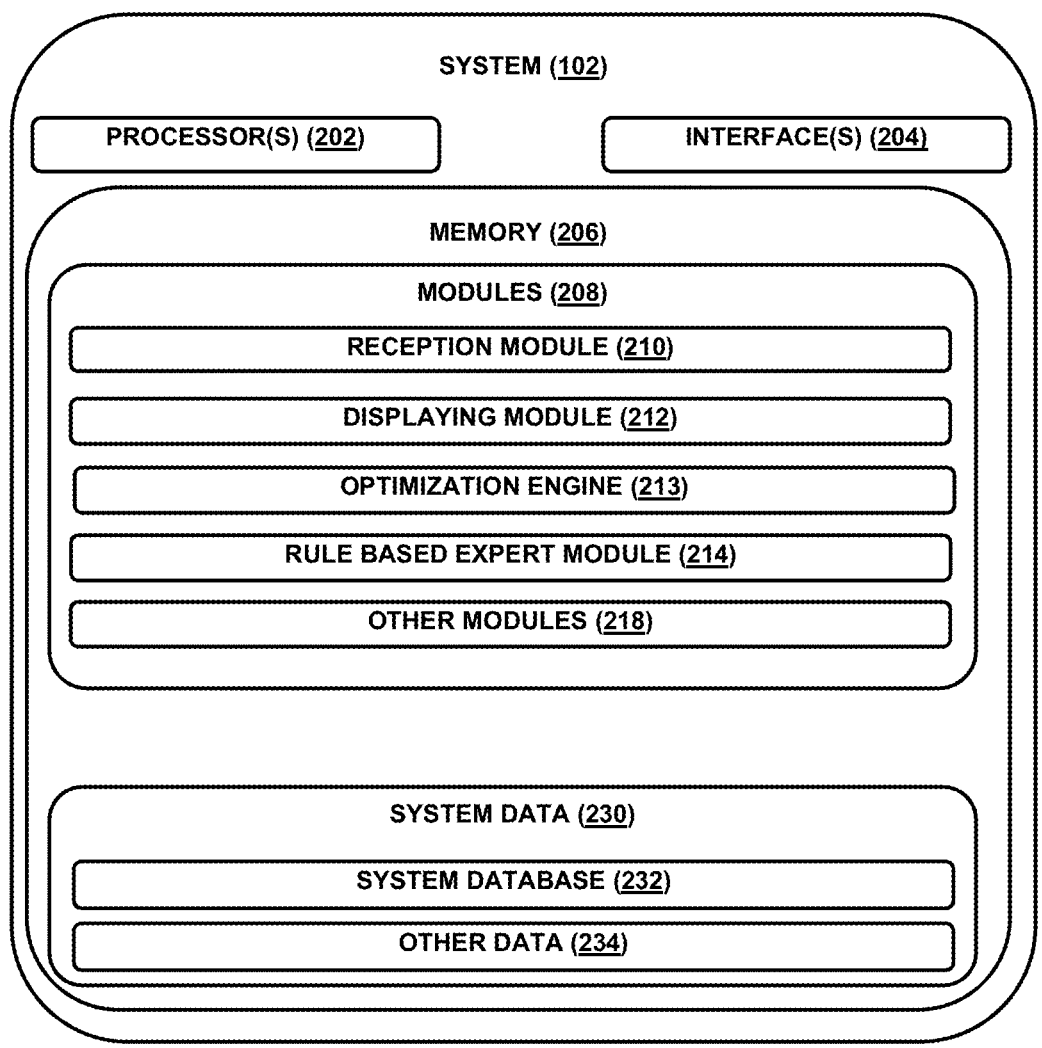
FIG. 2 illustrates the system for accessibility testing, in accordance with an embodiment of the present disclosure.

Referring to FIG. 2, the system 102 is illustrated in accordance with an embodiment of the present disclosure. In one embodiment, the system 102 may include at least one processor 202, an input/output (I/O) interface 204, and a memory 206. The at least one processor 202 may be implemented as one or more microprocessors, microcomputers, microcontrollers, digital signal processors, central processing units, state machines, logic circuitries, and/or any devices that manipulate signals based on operational instructions. Among other capabilities, the at least one processor 202 is configured to fetch and execute computer-readable instructions stored in the memory 206.

The I/O interface 204 may include a variety of software and hardware interfaces, for example, a web interface, a graphical user interface, and the like. The I/O interface 204 may allow the system 102 to interact with a user directly or through the user devices 104. Further, the I/O interface 204 may enable the system 102 to communicate with other computing devices, such as web servers and external data servers (not shown). The I/O interface 204 may facilitate multiple communications within a wide variety of networks and protocol types, including wired networks, for example, LAN, cable, etc., and wireless networks, such as WLAN, cellular, or satellite. The I/O interface 204 may include one or more ports for connecting a number of devices to one another or to another server.

The memory 206 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory 206 may include modules 208 and system data 230.

The modules 208 include routines, programs, objects, components, data structures, etc., which perform particular tasks or implement particular abstract data types. In one implementation, the modules 208 may include a reception module 210, a displaying module 212, an optimization engine 213, a rule based analysis module 214, and other modules 218. The other modules 218 may include programs or coded instructions that supplement applications and functions of the system 102.

The system data 230, amongst other things, serves as a repository for storing data processed, received, and generated by one or more of the modules 208. The system data 230 may also include a system database 232 and other data 234. The other data 234 may include data generated as a result of the execution of one or more modules in the other modules 218.

In one implementation, more than one user may use the client devices 104 to access the system 102 via the I/O interface 204. In one embodiment, the system 102 may employ the reception module 210 to receive a URL or a source code associated with the webpage from user devices 104. In one embodiment the user devices 104 may be a developer platform at which the webpage is developed.

In one embodiment the process of accessibility testing is synchronized with the Software Development Life Cycle (SDLC) of the webpage. In order to efficiently enable webpage to comply with an accessibility standards applicable thereto, accessibility compliance is considered by the system 102 in every phase of software development life cycle (SDLC) of the webpage.

In one embodiment, the process of ensuring accessibility compliance is initiated at the requirement analysis phase and continues throughout the SDLC cycle through design phase, development phase and finally ends at the testing phase. During the requirement analysis phase the webpage is carefully analysed to understand what accessibility standards/guidelines are applicable for the webpage. In one embodiment, the system 102 enables a user to specify the accessibility standard to which the user wants the webpage to be compliant to, using the I/O interface 204. Further, project specific guidelines are also accepted from the user by the system 102 at the requirement analysis phase using the I/O interface 204. In one embodiment, the system database 232 enables a repository for storing the project specific guidelines and the different accessibility standards for accessibility testing. The project specific guidelines need to be considered during the design phase, to render the design accessible. If the design of the webpage is not accessibly compliant, then the accessibility issues that come up at testing are very hard to fix, adding to time, cost and complexity of the project. Hence the system 102 enables accessibility testing at each level of SDLC.

In the first level of filtration, the system 102 allows the user to select an accessibility standards and a level of conformance from international standards including WCAG 2.0 and different country specific accessibility guidelines including Section 508, as well as client specific accessibility guidelines. Based on the selection made by the user, the system determines the first set of accessibility guidelines for determining the accessibility of the webpage. In one embodiment, this first level of filtration is done at requirement analysis phase of the SDLC.

In the second level of filtration, the system analyses the source code of the webpage to identify the elements present in the webpage. In one embodiment, this second level of filtration is done at test planning phase of the SDLC. Further, at the second level of filtration, once the set of elements in the webpage are identified, the set of elements is used to identify the second set of accessibility guidelines to be checked for accessibility testing of the webpage. The second set of accessibility guidelines are determined from the first set of accessibility guidelines based upon the set of elements present in the webpage and the set of common guidelines applicable to all the webpage's of the web application. Each of the guideline from the second set of guidelines is indicative of a check points corresponding to at least one element from the set of elements present on the webpage. Further, the number of occurrence of each element from the set of elements is also determined at the second level of filtration.

Further, at the third level of filtration is performed by the system 102 to identify the combination of testing tools to be used for accessibility testing of the webpage. The third level of filtration is performed by the optimization engine 213 and the rule based analysis module 214. The optimization engine 213 determines the time required for testing using different combination of testing tools based on the second set of accessibility guidelines, the level of conformance, the number of occurrences of the element of each type in the webpage. Further, the rule based analysis module 214 determines the optimal combination of accessibility testing tools based on the count of similar categories of webpage's in the web application, operational complexity associated with each of the accessibility testing tools, and a time required for testing the elements using different combinations of accessibility testing tools. In one embodiment, an element wise analysis is presented to the tester, displaying the elements present with applicable guidelines along with the tools to consider for testing the elements.

In one embodiment, the system 102 implements a method including a program code for determining a combination of accessibility testing tools to be used for accessibility testing of each webpage from a site or a set of webpage's, based on various operating factors including, but not limited to set of accessibility guidelines, level of conformance required, Number of occurrences of the element in a webpage, the number of similar types of webpage's in the site/collection, Operational complexity associated with each of the accessibility testing tools, Time required for testing each element using different accessibility testing tools. The system 102 for accessibility testing of the webpage is further explained with respect to the flowcharts of figure FIG. 3.

Figure 3:
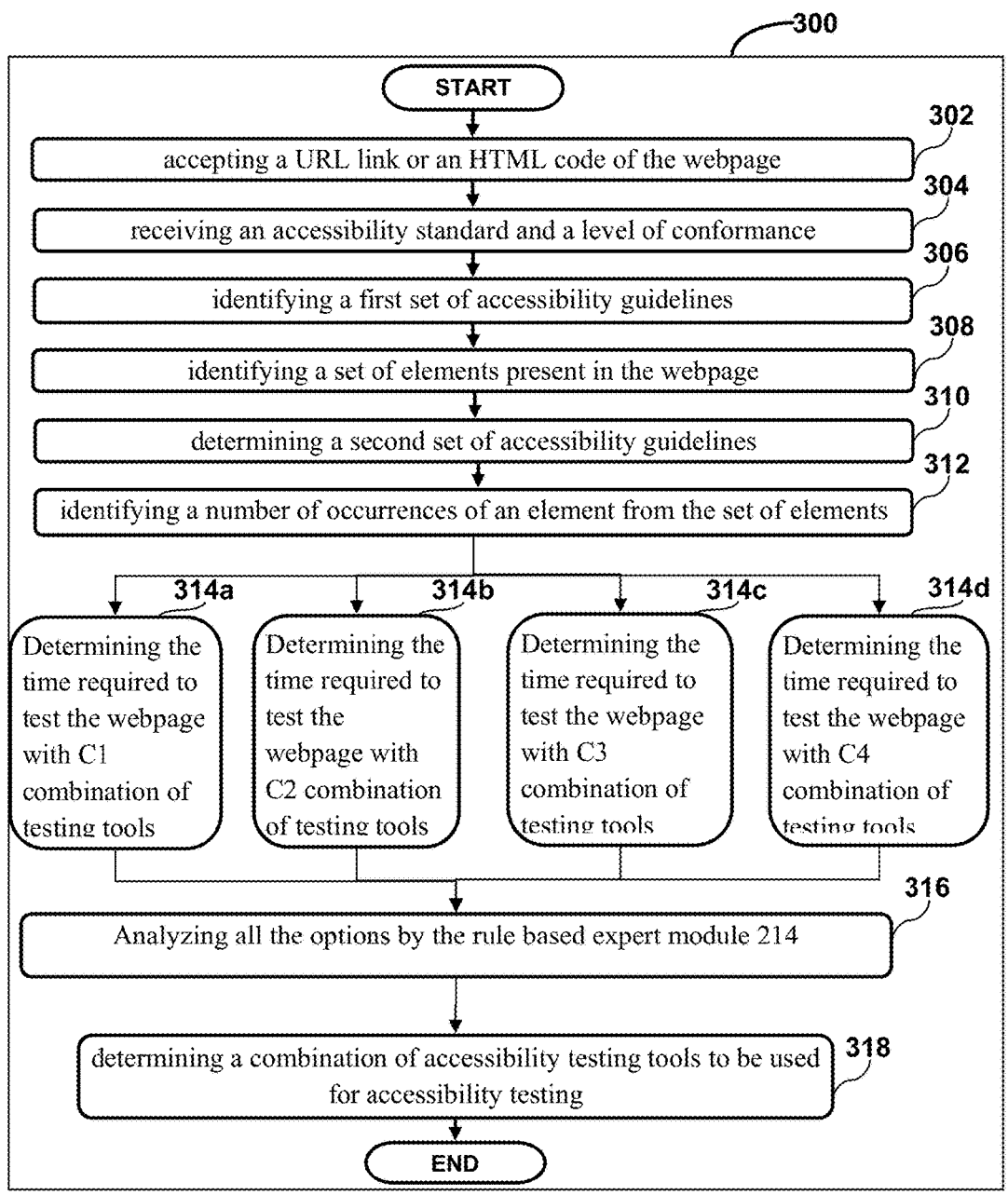
FIG. 3 illustrates a flowchart representing a method for accessibility testing using a group of testing tools, in accordance with an embodiment of the present disclosure.

Referring now to FIG. 3, a flowchart for performing accessibility testing of a webpage is disclosed. At block 302, the system 102 accepts a URL link or an HTML code of the webpage that is to be tested for accessibility compliance from the user device 104.

At block 304, the system 102 receives an accessibility standard and a level of conformance to be achieved for accessibility testing of the webpage from the user device 104. These accessibility standards are selected from Section 508, WCAG 1.0, WCAG 2.0, or any other country specific accessibility standards. Further, the level of conformance may be selected by the user as A, AA, or AAA, wherein the level of conformance is associated with the WCAG standards.

At block 306, the system 102 identifies a first set of accessibility guidelines based on the accessibility standard and the level of conformance that are specified by the user at step 304. In one embodiment, a repository is maintained in the system database 232, wherein the repository is configured to store jurisdiction specific accessibility guidelines such as Section 508 and globally accepted accessibility standards such as International Accessibility Standard Web Content Accessibility Guidelines WCAG 2.0 and the checkpoints/guidelines associated therewith. Further, the repository also stores the level of conformance associated with the WCAG standards. Once the user specifies the accessibility standard and the level of conformance, the system 102 refers to the repository to identify the first set of guidelines. The first set of guidelines is indicative of a set of checkpoints that need to be validated under the accessibility standards specified by the user.

At block 308, the system 102 analysis the source code associated with the webpage to identify a set of elements present in the webpage. In one embodiment, the source code may be written in programming languages such as HTML, CSS, Java Script and DOM is rendered through a web based programming language, wherein the programming language is selected from JAVA, HTML, PHP, ASP.Net, and Ruby Rails. The elements which are identified from the webpage may include links, menubars, images, Form Fields—Text boxes, Form Fields—Radio Buttons, Form Fields—Dropdowns, command buttons, carousels and accordions.

At block 310, a second set of accessibility guidelines is determined from the first set of elements, based upon the set of elements present in the webpage and the set of common guidelines applicable to all the webpage's of the web application. For example if the elements present on the webpage are identified as links, menubars, and images. Then the second set of accessibility guidelines includes only those guidelines from the first set of accessibility guidelines which are applicable to links, menubars, and images along with the common guidelines applicable to all webpage's of the web application.

At block 312, the system 102 further analysis the code of the webpage to identify a number of occurrences of each element from the set of elements present in the webpage. The different combinations of accessibility testing tools are selected from automated testing tools, Semi-automated tool, and Assistive Technology tools.

At block 314a, the system 102 determines the time t1 required for testing the elements present on the webpage using a combination C1 of accessibility testing tools based on the second set of accessibility guidelines, the level of conformance, and the number of occurrences of the element of each type in the webpage associate with the web application. In a similar manner, at block 314b, the system 102 determines the time t2 required for testing the elements present on the webpage using a combination C2 of accessibility testing tools. At block 314c, the system 102 determines the time t3 required for testing the elements present on the webpage using a combination C3 of accessibility testing tools. At block 314d, the system 102 determines the time t4 required for testing the elements present on the webpage using a combination C4 of accessibility testing tools. The time required t1-t4 in the blocks 314a to 314d are computed by the optimization engine 213.

At step 316, the time t1, t2, t3 and t4 required for testing each web page using different combinations of accessibility testing tools is transmitted to the rule based analysis module 214. The rule based analysis module 214 is configured to perform rule based analysis on the time t1, t2, t3 and t4 required for testing the webpage using different combination c1, c2, c3, and c4 of testing tools in order to determine a combination of accessibility testing tools to be used for accessibility testing of the web application. Further, the rule based analysis is performed based on the count of similar categories of webpage's in the web application, operational complexity associated with each of the accessibility testing tools, and a time factor to test the elements using different accessibility testing tools.

In one embodiment, the category of webpage in the web application is determined based on the complexity and occurrences of the elements present in the webpage of the web application. The complexity of the webpage also depends on the time required and the percentage coverage of the manual testing for each element in the webpage.

Further, the rule based analysis module 214 is enabled with a knowledge base, wherein the knowledge base stores different rules applicable to determine operational complexity associated with each of the accessibility testing tool. The rule based system determines the operational complexity associated with each of the combination of accessibility testing tools and transfers this information to the system 102.

Based on the feedback received from the rule based analysis module 214, at block 318, the system 102 determines a combination of accessibility testing tools to be used for accessibility testing of the webpage based on the second set of accessibility guidelines, the level of conformance, the number of occurrences of the element in the webpage, time required for testing each element using different accessibility testing tools, and operational complexity associated with each of the accessibility testing tools.

In one embodiment, the operational complexity associated with each of the accessibility testing tools is determined by the rule based analysis module 214 based on the efforts and time required to implement the accessibility testing tool. Further, the time required for testing an element using a particular testing tool is determined using historical information associated with testing time.

In one embodiment, a program code for determining a combination of accessibility testing tools to be used for accessibility testing of each webpage is determined based on various operating factors associated with the accessibility testing tools, these operating factors include but are not limited to:

Set of accessibility guidelines
Level of conformance specified by the user
Number of occurrences of the element in a webpage
The number of similar types of webpages in the site/collection
Operational complexity associated with each of the accessibility testing tools
Time required for testing each element using different accessibility testing tools The system 102 implements two methods, described below, to determine the combination of accessibility testing tools to be used. Either of these methods or combination can be used.

Selection of Tools Using Optimization Engine 213:

the system 102 implements the optimization engine 213 to find which combination of testing tools to be used for each web page in a website or from a set of web pages. The function of the optimization engine 213 is to minimize overall testing effort for entire website or a set of web pages for which accessibility testing is to be carried out. In one embodiment all checkpoints of each element in each web page should be checked by the accessibility testing tool.

A tool can test some specific set of checkpoints in each webpage

A tool require a specific time to test given checkpoint of the element

A tool require a specific setup time when used for testing. The setup time includes, but is not limited to, time for setting up accessibility testing tool before/after testing, additional cycle of processing required for testing, documentation overhead etc.

The optimization engine 213 determines the combination of accessibility testing tools to be used for accessibility testing based on a fixed setup time and variable checkpoint testing time wherein total testing time is minimized. The optimization engine 213 uses the aforementioned inputs and constraints/rules/priorities to generate allocation plan using a combination of techniques like linear programming, integer programming, heuristics and meta-heuristics.

These accessibility testing tools may include automated testing tools, Accessibility Toolbars, and Assistive Technology tools. It may be understood that the system 102 analyses different combination of the testing tools to determine the optimal combination of accessibility testing tools to be used in order to conduct the accessibility testing of the webpage based on the second set of guidelines in shortest time cycle.

Selection of Tools Using Rule Based Expert System:

The Rule Based Expert System enables the rule based analysis module 214, wherein various rules are keyed into a knowledge base of the system 102 by a committee of expert users, representing their knowledge of what combination of testing tools to be chosen given specific combination of operating factors as mentioned above. Once the expert system accepts information associated with the operating factors, the expert system applies different rules that are stored in the knowledge base and automatically recommends which combination of tools to be used for testing the web application. The combination of accessibility testing tools may be selected from a set of automated testing tools T1, Semi-automated tools T2, and Assistive Technology tools T3. The different combinations of testing tools may be generated by selecting tools from T1, T2, and T3 a C1=T1+T2+T3 (one tool selected from each set T1, T2, and T3)
C2=T1+T3 (one tool selected from each set T1 and T3)
C3=T2+T3 (one tool selected from each set T2 and T3)
C4=T3 (one tool selected from the set T3)

In one embodiment, the optimization engine identifies the time required for testing using the combinations C1 to C4. Further, the optimization engine determines the combination of testing tools which requires minimum time for testing the web page. However, the rule based analysis module 214 further analyzes the different combination based on the implementation efforts associated with each of the testing tool.

In one embodiment, the rule based analysis module 214 is configured to maintain a set of rules applicable to determine the combination of accessibility testing tools to be used to test the web application based on the testing time required to test the web application using each combination of testing tools. In one embodiment, the rule based analysis module 214 initially determines whether the minimum time for testing the web page is less than a predefined threshold "x". Further, the rule based analysis module 214 determines whether the difference between the minimum time for testing the web page and the time required for testing the webpage using assistive tools is less than a predetermined threshold "y". Then the rule based analysis module 214 suggests using assistive tool in place of the combination of tools associated with the minimum time for testing. Further, if the difference between the lowest time and the second lowest time is greater than a predefined threshold "z" and the number of similar web pages in the web application are greater than predefined threshold "q". Then the rule based analysis module 214 suggests using the combination of tools associated with the minimum time for testing. If the above condition is not satisfied, the rule based analysis module 214 suggests using second lowest combination of tools in place of the first lowest combination.

In one embodiment, if it is determined that approximately equal number of checkpoints can be tested using two different combinations C2 and C3 of testing tools, the difference between testing time of both the combinations C1 and C2 is greater than a threshold value Z, and the number of similar web pages in the web application is tested using the combination C2 and C3 is greater than the threshold a, then the rule based analysis module suggest using combination C2. Further, if the difference between testing time of C2 and C3 is greater than is threshold d, then the rule based analysis module 214 suggests using the combination C2 else if the difference between testing time of C2 and C3 is less than is threshold d, then the rule based analysis module 214 suggests using the combination C3.

In one embodiment, if it is found that the difference between the number of checkpoints covered by combination C2 and (CLR+CSS) is 100% and difference between the time for testing between C3 and C2 is greater than the threshold z, and the number of similar web pages in the web application is greater than threshold d, then the combination C2 is selected or else the combination C3 is selected by the rule based analysis module 214.

Further, the system 102 is configured to adapt and self-learn over a period of time based upon the different elements present on the web page and the combination of tools that is derived by the rule based analysis module 214. Given a set of input data (web pages) and decision taken on that data, the expert system is configured to automatically generate knowledge base i.e. build rules and over the period the expert system is configured to improve the knowledge base, which in turn would improve decision accuracy.

Working Example

In one embodiment, the system 102 enables a user authentication step to sign up into the system 102 by providing his/her profile details. Upon successful sign in to the system 102, the user creates a project with the web application details along with the details associated with the type of project such as web application development project or web application testing project. In the first level of filtration, the system 102 allows the user to select an accessibility standards and a level of conformance from international standards including WCAG 2.0 A,AA and as well as client specific accessibility guidelines. Based on the selection made by the user, the system determines the first set of accessibility guidelines for determining the accessibility of the web application. In one embodiment, this first level of filtration is done at requirement analysis phase of the SDLC.

In one embodiment, the system 102 is configured to process single webpage or multiple webpage's (in a batch), URLs and is capable of parsing the HTML code of the webpage to identify the elements present in the webpage. Further, the system is also configured to identify the number of occurrences of each element on the webpage or the group of web pages. Further, in case the system 102 is capable of evaluating all fan-out links from the URL. Further, the system 102 is configured to crawl links from the input page and evaluate webpage's associated with these links for the elements present, number of occurrence of the element in an individual webpage, the number of similar types of webpage's in the set of web pages.

In the second level of filtration, the system analyses the source code of the webpage to identify the elements present in the webpage. In one embodiment, this second level of filtration is done at design/construction phase of the SDLC. Further, at the second level of filtration, once the set of elements in the webpage are identified, the set of elements is used to identify the second set of accessibility guidelines to be checked for accessibility testing of the webpage. The second set of accessibility guidelines are identified from the first set of accessibility guidelines based upon the set of elements present in the webpage and the set of common guidelines applicable to all the webpage's of the web application. Each of the guideline from the second set of guidelines is indicative of a check points corresponding to at least one element from the set of elements present on the webpage. Further, the number of occurrence of each element from the set of elements is also determined at the second level of filtration.

Further, at the third level of filtration is performed by the system 102 to identify the combination of testing tools to be used for accessibility testing of the webpage. In one embodiment, the third level of filtration is done at test planning phase of the SDLC. The third level of filtration is performed by the optimization engine 213 and the rule based analysis module 214. The optimization engine 213 determines the time required for testing using different combination of testing tools based on the second set of accessibility guidelines, the level of conformance, the number of occurrences of the element of each type in the webpage. Further, the rule based analysis module 214 determines the optimal combination of accessibility testing tools based on the count of similar categories of webpage's in the web application, operational complexity associated with each of the accessibility testing tools, and a time required for testing the elements using different combinations of accessibility testing tools. In one embodiment, landscape of the page-wise analysis for the combination of tool for testing the web application is presented to the tester along with the details of tools to be used for specific checkpoint.

In one embodiment, the system 102 implements a method comprises a program code for determining a combination of accessibility testing tools to be used for accessibility testing of each webpage from a site or a set of webpage's, based on various operating factors including, but not limited to set of accessibility guidelines, level of conformance required, type of element present and number of occurrences of the element in a webpage, the number of similar types of webpage's in the site/collection, operational complexity associated with each of the accessibility testing tools, time required for testing each element using different accessibility testing tools.

In one embodiment, the system 102 is capable of determining the optimal combination of the accessibility testing tool to test a particular web page of the web application. The system 102 is capable of determining the all possible combination of different assessment tools that can be used for accessibility assessment of the webpage. In one embodiment, there are checkpoint(s) which can be tested by only one tool and several checkpoints which can be performed by one or more tools and the time required to test these checkpoints differ from one tool to another. Further the system 102 refines the optimal combination of accessibility testing tools to test web page using the optimizing engine.

The optimizing engine shifts the checkpoint from one tool to other to reduce the testing cycle and tool to be used to test that page.

Figure 4:
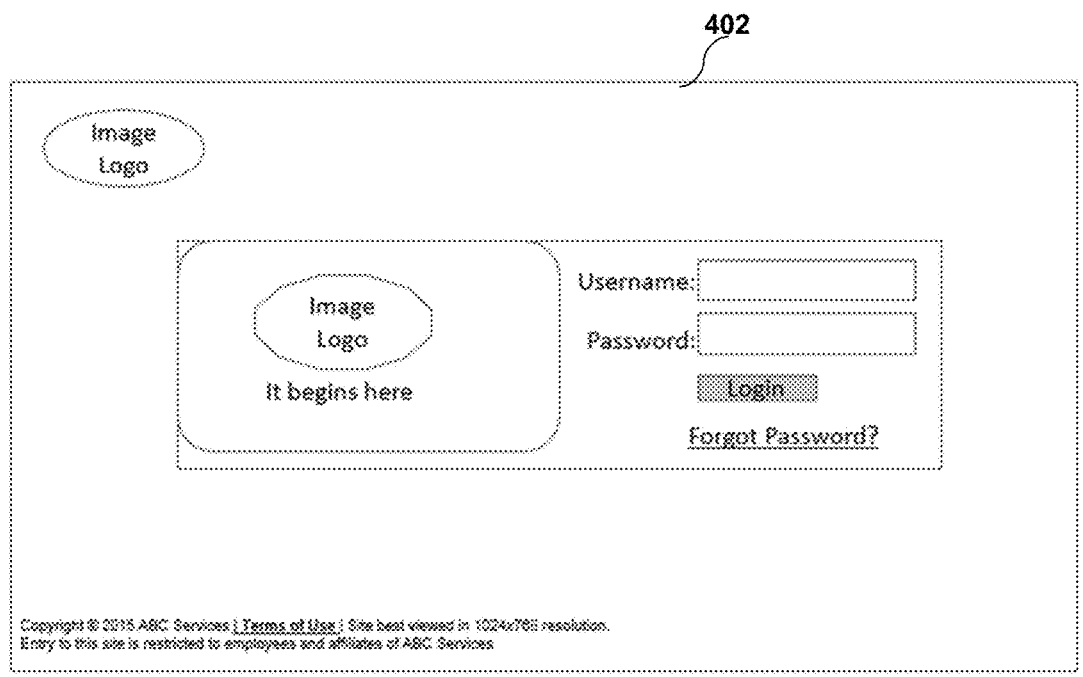
FIG. 4 illustrates a Login webpage analyzed by the system for accessibility testing, in accordance with an embodiment of the present disclosure.
Figure 5:
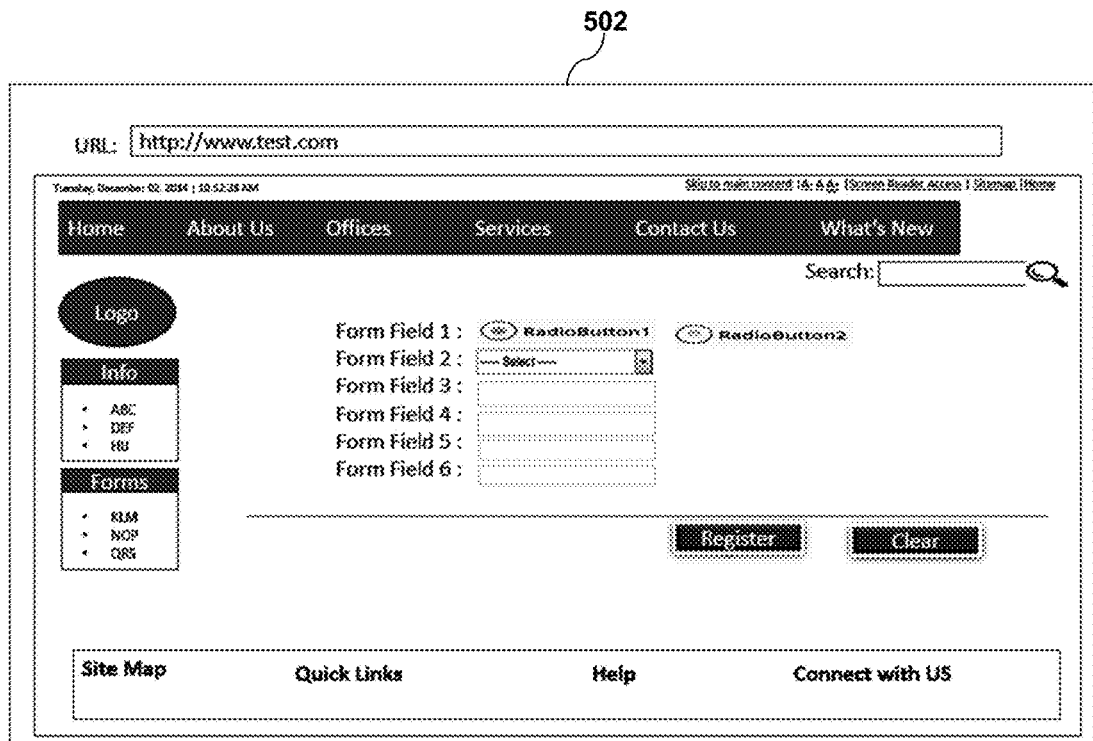
FIG. 5 illustrates a Home webpage analyzed by the system for accessibility testing, in accordance with an embodiment of the present disclosure.
Figure 6:
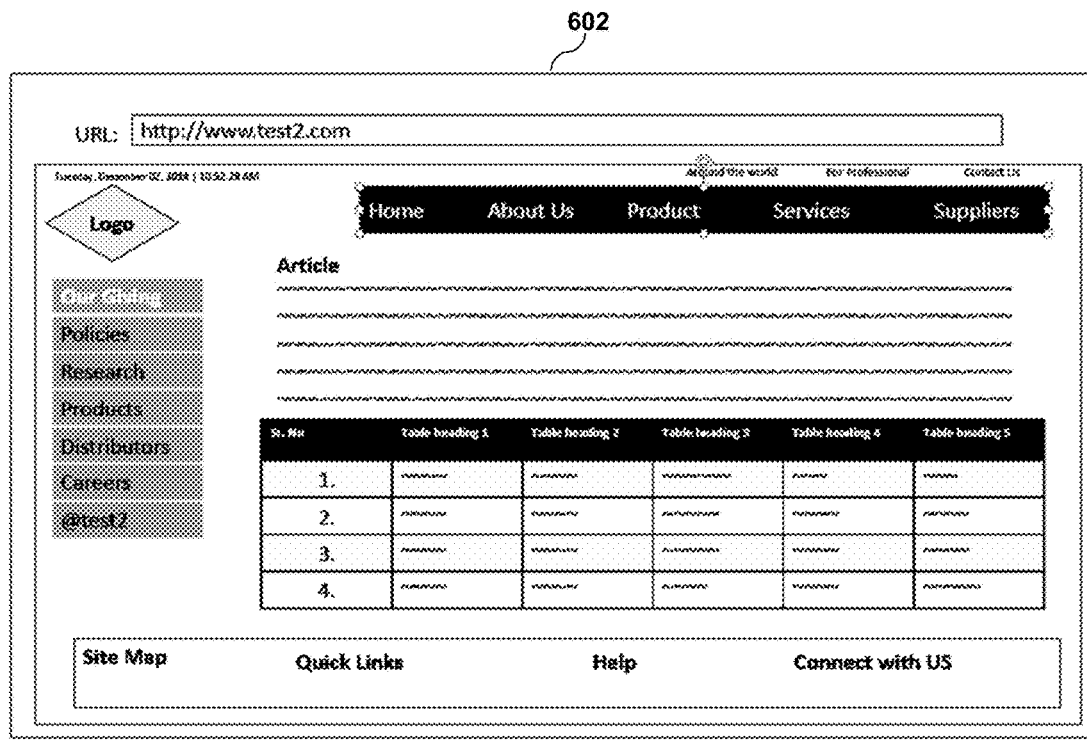
FIG. 6 illustrates a article webpage analyzed by the system for accessibility testing, in accordance with an embodiment of the present disclosure.

To elaborate the process of determining the optimal combination of testing tools to be used for testing the web application are illustrated with respect to three different examples covered in example 1, example 2 and example 3 respectively. In example 1, a webpage 402 of a login screen of a website as represented in FIG. 4 is analysed. Considering the scenario of example 1, the web page 402 is analysed. In the first step the system 102 accepts the accessibility standards as 'WCAG 2.0' and level of conformance as 'AA' to be complied by the webpage 402. Based on the accessibility standard and the level of conformance, the system generates the first set of guidelines for testing the webpage 402. In the next step, the system 102 analysis the code of webpage 402 and determines the set of elements that are present in the webpage 402. The set of elements and small set of applicable common checkpoints is represented in the first column of table 1. The checkpoints applicable to each element for the set of elements are represented in column 2 of table 1.

There are 45 guidelines/checkpoints for the set of elements out of which 41 can be tested using screen reader and 31 can be tested using toolbar. Further, the number of occurrence of the elements from the set of elements is represented in column 3 of table 1. Further, the number of guidelines that can be tested using automated tool, toolbar and screen reader are represented in column 4, 5, and 6 respectively. Further, the efforts required to test the particular webpage using the different combination of the tools is calculated by the optimization engine 213 using the efforts required for testing each element using automation tool (T1), semi-automated (T2), and Assistive technology (T3) and represented in the table 2.

Further, the efforts required to test the webpage 502 using the different combination of the tools is calculated and represented in the table 2. Considering the data in table 2, it is observed that by using the combinations C4, C3, C2, and C1 the time required for testing the web page 402 is 33.45 min, 26.7 min, 22.55 min, and 19.5 min respectively. It is observed that minimum time for testing the web page 402 is by using the combination of C1 which is 19.5 min. The system 102 further analysis this data of table 2 using the rule based analysis module 214. The rule based analysis module 214 considers testing time, number of occurrence of elements and operation complexity of each tool and accordingly suggests using the C4 to test the Webpage 402.

TABLE 1

Analysis of elements in webpage 402

| Elements on web page 402 | Total Checkpoints applicable to each element | Number of Occurrence of each element | No of checkpoints tested by Automation tool (T1) | No of checkpoints tested by semi automated tool (T2) | No of checkpoints tested by Assistive technology tool (T3) |
|---|---|---|---|---|---|
| Links | 5 | 2 | 1 | 2 | 5 |
| Images | 11 | 1 | 7 | 11 | 11 |
| Forms (Edit Box) | 6 | 2 | 3 | 5 | 6 |
| Buttons | 4 | 1 | 1 | 1 | 4 |
| Error validation of form fields | 7 | 2 | — | — | 7 |
| (Sample) Guidelines Common for all Pages | | | | | |
| Resize text | 3 | 1 | — | 3 | 1 |
| Color Analyzer | 2 | 1 | 1 | 2 | 0 |
| Headings | 4 | 1 | 2 | 4 | 4 |
| Page Information | 3 | 1 | — | 3 | 3 |
| Total | 45 | | 15 | 31 | 41 |

TABLE 2

Time for testing web page 402 using different combinations of tools

| Tools Option to Test the Page | Example 3 efforts in mins |
|---|---|
| C1 (T1 + T2 + T3) | 19.5 |
| C2 (T1 + T3) | 22.55 |
| C3 (T2 + T3) | 26.7 |
| C4 (T3) | 33.45 |

Considering the scenario of example 2, a web page 502 is analysed. The webpage 502 corresponds to a homepage of a website. In the first step the system 102 accepts the accessibility standards as 'WCAG 2.0' and level of conformance as 'AA' to be complied by the webpage 502. Based on the accessibility standard and the level of conformance, the system generates the first set of guidelines for testing the webpage 502. In the next step, the system 102 analysis the code of webpage 502 and determines the set of elements that are present in the webpage 502. The set of elements and small set of applicable common checkpoints is represented in the first column of table 3. The checkpoints applicable to each element for the set of elements are represented in column 2 of table 3. There are 66 guidelines/checkpoints for the set of elements out of which 62 can be tested using screen reader and 36 can be tested using toolbar, and 17 can be tested using Automation tool.

Further, the number of occurrence of the elements from the set of elements is represented in column 3 of table 3. Further, the number of guideline's that can be tested using automated tool, toolbar and screen reader are represented in column 4, 5, and 6 of table 3 respectively. Further, the efforts required to test the webpage 502 using the different combination of the tools is calculated by the optimization engine 213 based on efforts required for testing each element using automation tool (T1), semi-automated (T2), and Assistive technology (T3) and represented in the table 4. Considering the data in table 4, it is observed that by using the combination C4, C3, C2, and C1 the time required for testing the web page 502 is 113.45 min, 98.1 min, 83.25 min, and 86.1 min respectively. It is observed that minimum time for testing the web page 502 is by using the combination of C2 which is 83.25 min. The system 102 further analysis this data of table 4 using the rule based analysis module 214. The rule based analysis module 214 considers testing time, number of occurrence of elements and operation complexity of each tool and accordingly suggests the combination of C2 to test the Webpage 502.

the system generates the first set of guidelines for testing the webpage 602. In the next step, the system 102 analysis the code of webpage 602 and determines the set of elements that are present in the webpage 602. The set of elements and small set of applicable common checkpoints is represented in the first column of table 5. The checkpoints applicable to each element from the set of elements are represented in column 2 of table 5. There are 47 guidelines/checkpoints for the set of elements out of which 43 can be tested using screen reader and 35 can be tested using toolbar, and 15 can be tested using automation tool. Further, the number of

TABLE 3

Analysis of elements in webpage 502

| Elements on web page 502 | Total Checkpoints applicable to each element | Number of Occurrence of each element | No of checkpoints tested by Automation tool (T1) | No of checkpoints tested by semi automated tool (T2) | No of checkpoints tested by Assistive technology tool (T3) |
|---|---|---|---|---|---|
| Links | 5 | 24 | 1 | 2 | 5 |
| Images | 11 | 1 | 7 | 11 | 11 |
| Forms (Edit Box) | 6 | 5 | 3 | 5 | 6 |
| Buttons | 4 | 2 | 1 | 1 | 4 |
| Radio Buttons | 4 | 2 | 1 | 2 | 4 |
| Drop downs | 6 | 2 | 1 | 1 | 6 |
| Menubar | 11 | 1 | — | 2 | 11 |
| Error validation of form fields | 7 | 5 | — | — | 7 |
| Sample Guidelines Common for all Pages | | | | | |
| Resize text | 3 | 1 | — | 3 | 1 |
| Color Analyzer | 2 | 1 | 1 | 2 | 0 |
| Headings | 4 | 1 | 2 | 4 | 4 |
| Page Information | 3 | 1 | 0 | 3 | 3 |
| Total | 66 | 46 | 17 | 36 | 62 |

TABLE 4

Time for testing web page 502 using different combinations of tools

| Tools Option to Test the Page | Example 2 efforts in min's |
|---|---|
| C1 (T1 + T2 + T3) | 86.1 |
| C2 (T1 + T3) | 83.25 |
| C3 (T2 + T3) | 98.1 |
| C4 (T3) | 113.45 |

Considering the scenario of example 3, a web page 602 is analysed. The webpage 602 corresponds to articles page of a website. In the first step the system 102 accepts the accessibility standards as 'WCAG 2.0' and level of conformance as 'AA' to be complied by the webpage 602. Based on the accessibility standard and the level of conformance, occurrence of the elements form the set of elements is represented in column 3 of table 5. Further, the number of guideline's that can be tested using automated tool, toolbar and screen reader are represented in column 4, 5, and 6 of table 5 respectively. Further, the efforts required to test the webpage 602 using the different combination of the tools is calculated by the optimization engine 213 based on efforts required for testing each element using automation tool (T1), semi-automated (T2), and Assistive technology (T3) and represented in the table 6. Considering the data in table 6, it is observed that by using the combination C4, C3, C2, and C1 the time required for testing the web page 602 is 93.35 min, 76.8 min, 65.65 min, and 70.2 min respectively. It is observed that minimum time for testing the web page 602 is by using the combination of C2 which is 65.65 min. However, the system 102 further analysis this data of table 6 using the rule based analysis module 214. The rule based analysis module 214 considers testing time, number of occurrence of elements and operation complexity of each tool and accordingly suggests the combination of C3 to test the Webpage 602.

TABLE 5

Analysis of elements in webpage 602

| Elements on web page 602 | Total Checkpoints applicable to each element | Number of Occurrence of each element | No of checkpoints tested by Automation tool (T1) | No of checkpoints tested by semi automated tool (T2) | No of checkpoints tested by Assistive technology tool (T3) |
|---|---|---|---|---|---|
| Links | 5 | 24 | 1 | 2 | 5 |
| Images | 11 | 1 | 7 | 11 | 11 |
| Menubar | 11 | 1 | | 2 | 11 |
| Table | 8 | 1 | 4 | 8 | 8 |
| Sample Guidelines Common for all Pages | | | | | |
| Resize text | 3 | 1 | — | 3 | 1 |
| Color Analyzer | 2 | 1 | 1 | 2 | 0 |
| Headings | 4 | 1 | 2 | 4 | 4 |
| Page Information | 3 | 1 | 0 | 3 | 3 |
| Total | 47 | 31 | 15 | 35 | 43 |

TABLE 6

Time for testing web page 602 using different combinations of tools

| Tools Option to Test the Page | Example 3 efforts in min's |
|---|---|
| C1 (T1 + T2 + T3) | 70.2 |
| C2 (T1 + T3) | 65.65 |
| C3 (T2 + T3) | 76.8 |
| C4 (T3) | 93.35 |

The system 102 is robust, well-structured, easy to adopt, helps in enhancing testing efficiency, decrease cycle times due to integration of accessibility in early stage of software development life cycle which leads to reduction in development cost. The critical characteristics of the system 102 are (1) Universal design, (2) Accessibility and usability centric development and testing methodologies, and (3) End to End accessibility assessment integrated into SDLC process ensures an enhanced customer experience and compliance with International standards, guidelines, regulations. The system 102 ensures regulatory compliance, reduce manual effort, and reduce cost for accessibility testing.

In one embodiment, the system 102 leverages in-house tools to assets and adapt to other best practices to provide value-added accessibility services. A core objective of automated testing, and manual testing in the SDLC is to helps prevent defects from cumulating till the screen reader testing phase, which is effort intensive.

Although implementations of system and method for accessibility testing of a webpage, it is to be understood that the appended claims are not necessarily limited to the specific features or methods described herein. However, the specific features and methods are disclosed as examples of implementations for displaying/presenting the data in multiple levels on the user interface.

What is claimed is:

1. A system for accessibility testing of a web application, the system comprising:
   a memory; and
   a processor coupled to the memory, wherein the processor is configured to perform the steps of:
      receiving an accessibility standard and a level of conformance to be achieved for accessibility testing of a webpage associated with the web application;
      identifying a first set of accessibility guidelines based on the accessibility standard and the level of conformance;
      identifying a set of elements present in the webpage by analyzing a source code associated with the webpage;
      determining a second set of accessibility guidelines based upon the set of elements present in the webpage and a set of common guidelines applicable to all webpages of the web application, wherein the second set of accessibility guidelines is a subset of the first set of accessibility guidelines;
      identifying a number of occurrences of an element from the set of elements present in the webpage;
      determining by an optimization engine a time required for testing the web page using different combinations of testing tools based on the second set of accessibility guidelines, the level of conformance, and the number of occurrences of the element of each type in the webpage; and
      performing a rule based analysis on the time required for testing the web page using different combinations of testing tools to determine a combination of accessibility testing tools to be used for accessibility testing of the web application,
      wherein the rule based analysis determines the combination of accessibility testing tools based on a count of similar categories of the webpages in the web application and occurrences of elements present in the web page, an operational complexity associated with each of the combination of the accessibility testing tools, and a minimum time required for testing the set of elements using the combination of the accessibility testing tools, wherein the count of similar categories is determined based on a complexity of the web page that depends on a time required and percentage coverage of a manual testing for each element in the web page, wherein the processor is further configured to adapt and self-learn over a period of time to automatically generate a knowledge base to improve the accuracy of subsequent determinations of accessibility testing tools to be used for accessibility testing of web applications, the adapting and self-learning being based on the set of elements present in the webpage and the combination of accessibility testing tools that is derived by the rule based analysis.

2. The system of claim 1, wherein the accessibility testing of the web application is synchronized with a software development lifecycle (SDLC) of the web application by:
receiving the accessibility standard and the level of conformance and generating the first set of accessibility guidelines at a requirement analysis phase of the SDLC;
identifying the set of elements present in the webpage, determining the second set of accessibility guidelines, and identifying the number of occurrences of an element is performed at a test planning phase of the SDLC;
determining the time required for testing the web page and performing the rule based analysis is performed at a testing phase of the SDLC.

3. The system of claim 1, wherein the first set of accessibility guidelines is a repository configured to store jurisdiction specific accessibility guidelines and further enabled to store an International Accessibility Standard Web Content Accessibility Guidelines (WCAG), the level of conformance is associated with the WCAG.

4. The system of claim 1, wherein the source code comprises one of HTML, CSS, Java Script, and DOM is rendered through a web based programming language, wherein the web based programming language comprises one of JAVA, HTML, PHP, ASP.Net, and Ruby Rails.

5. The system of claim 1, wherein the set of elements comprise links, menubars, images, Form Fields—Text boxes, Form Fields—Radio Buttons, Form Fields—Dropdowns, command buttons.

6. The system of claim 1, wherein the accessibility testing tools comprise automated testing tools, Accessibility Toolbars, and Assistive Technology tools.

7. A method for accessibility testing of a web application, the method comprising:
receiving, by a processor, an accessibility standard and a level of conformance to be achieved for accessibility testing of a webpage associated with the web application;
identifying, by the processor, a first set of accessibility guidelines based on the accessibility standard and the level of conformance;
identifying, by the processor, a set of elements present in the webpage by analyzing a source code associated with the webpage;
determining, by the processor, a second set of accessibility guidelines based upon the set of elements present in the webpage and a set of common guidelines applicable to all webpages of the web application, wherein the second set of accessibility guidelines is a subset of the first set of accessibility guidelines;
identifying, by the processor, a number of occurrences of an element from the set of elements present in the webpage;
determining, by the processor using an optimization engine a time required for testing the web page using different combinations of testing tools based on the second set of accessibility guidelines, the level of conformance, and the number of occurrences of the element of each type in the webpage; and
performing, by the processor, a rule based analysis on the time required for testing the web page using different combination of testing tools to determine a combination of accessibility testing tools to be used for accessibility testing of the web application,
wherein the rule based analysis determines the combination of accessibility testing tools based on a count of similar categories of the webpages in the web application and occurrences of elements present in the web page, an operational complexity associated with each of the combination of the accessibility testing tools, and a minimum time required for testing the set of elements using the combination of the accessibility testing tools,
wherein the count of similar categories is determined based on a complexity of the web page that depends on a time required and percentage coverage of a manual testing for each element in the web page, wherein the method further comprises adapting and self-learning over a period of time to automatically generate a knowledge base to improve the accuracy of subsequent determinations of accessibility testing tools to be used for accessibility testing of web applications, the adapting and self-learning being based on the set of elements present in the webpage and the combination of accessibility testing tools that is derived by the rule based analysis.

8. The method of claim 7, wherein the accessibility testing of the web application is synchronized with a software development lifecycle (SDLC) of the webpage application by:
receiving the accessibility standard and the level of conformance and generating the first set of accessibility guidelines at a requirement analysis phase of the SDLC;
identifying the set of elements present in the webpage, determining the second set of accessibility guidelines, and identifying the number of occurrences of an element is performed at a test planning phase of the SDLC;
determining the time required for testing the web page and performing the rule based analysis is performed at a testing phase of the SDLC.

9. The method of claim 7, wherein the first set of accessibility guidelines is a repository configured to store jurisdiction specific accessibility guidelines and enabled to store the International Accessibility Standard Web Content Accessibility Guidelines (WCAG), the level of conformance is associated with the WCAG.

10. The method of claim 7, wherein the source code comprises one of HTML, CSS, Java Script, and DOM is rendered through a web based programming language, wherein the web based programming language comprises one of JAVA, HTML, PHP, ASP.Net, and Ruby Rails.

11. The method of claim 7, wherein the set of elements comprises links, menubars, images, Form Fields—Text boxes, Form Fields—Radio Buttons, Form Fields—Dropdowns, Command Buttons.

12. The method of claim 7, wherein the accessibility testing tools comprise Automated Testing Tools, Accessibility Toolbars, and Assistive Technology Tools.

13. A computer program product including a non-transitory computer readable medium having embodied thereon a computer program for accessibility testing of a web application, the computer program product comprising:
a program code for receiving an accessibility standard and a level of conformance to be achieved for accessibility testing of a webpage associated with the web application;

a program code for identifying a first set of accessibility guidelines based on the accessibility standard and the level of conformance;

a program code for identifying a set of elements present in the webpage by analyzing a source code associated with the webpage;

a program code for determining a second set of accessibility guidelines based upon the set of elements present in the webpage and a set of common guidelines applicable to all webpages of the web application, wherein the second set of accessibility guidelines is a subset of the first set of accessibility guidelines;

a program code for identifying a number of occurrences of an element from the set of elements present in the webpage;

a program code for determining by an optimization engine a time required for testing the web page using different combinations of testing tools based on the second set of accessibility guidelines, the level of conformance, and the number of occurrences of the element of each type in the webpage; and a program code for performing rule based analysis on the time required for testing the web page using different combination of testing tools to determine a combination of accessibility testing tools to be used for accessibility testing of the web application, wherein the rule based analysis determines the combination of accessibility testing tools based on a count of similar categories of the webpages in the web application and occurrences of elements present in the web page, an operational complexity associated with each of the combination of the accessibility testing tools, and a minimum time required for testing the set of elements using the combination of the accessibility testing tools, wherein the count of similar categories is determined based on a complexity of the web page that depends on a time required and percentage coverage of a manual testing for each element in the web page, wherein the computer program product further comprising program code for adapting and self-learning over a period of time to automatically generate a knowledge base to improve the accuracy of subsequent determinations of accessibility testing tools to be used for accessibility testing of web applications, the adapting and self-learning being based on the set of elements present in the webpage and the combination of accessibility testing tools that is derived by the rule based analysis.

* * * * *